United States Patent
Ludicky

[11] Patent Number: 5,089,953
[45] Date of Patent: Feb. 18, 1992

[54] CONTROL AND ARBITRATION UNIT

[75] Inventor: Frank J. Ludicky, Rockford, Ill.

[73] Assignee: Sundstrand Corporation, Rockford, Ill.

[21] Appl. No.: 563,833

[22] Filed: Aug. 3, 1990

Related U.S. Application Data

[63] Continuation of Ser. No. 138,202, Dec. 28, 1987, abandoned.

[51] Int. Cl.[5] ............................................. G06F 13/36
[52] U.S. Cl. ............................ 395/425; 364/242.6; 364/242.91; 364/242.92; 364/DIG. 1; 395/800
[58] Field of Search ............................. 364/200, 900

[56] References Cited

U.S. PATENT DOCUMENTS

| | | | |
|---|---|---|---|
| 4,214,305 | 7/1980 | Tokita et al. | 364/200 |
| 4,245,303 | 1/1981 | Durvasula et al. | 364/200 |
| 4,384,323 | 5/1983 | Ahuja | 364/200 |
| 4,449,183 | 5/1984 | Flahive et al. | 364/200 |
| 4,453,214 | 6/1984 | Adcock | 364/200 |
| 4,495,567 | 1/1985 | Treen | 364/200 |
| 4,499,538 | 2/1985 | Finger et al. | 364/200 |
| 4,513,390 | 4/1985 | Walter et al. | 364/900 |
| 4,535,330 | 8/1985 | Carey et al. | 340/825.5 |
| 4,556,953 | 12/1985 | Caprio et al. | 364/900 |
| 4,570,220 | 2/1986 | Tetrick et al. | 364/200 |
| 4,586,128 | 4/1986 | DeWoskin | 364/200 |
| 4,597,054 | 6/1986 | Lockwood et al. | 364/200 |
| 4,621,342 | 11/1986 | Capizzi et al. | 364/900 |
| 4,646,232 | 2/1987 | Chang et al. | 364/200 |
| 4,724,520 | 2/1988 | Athanas et al. | 364/200 |
| 4,811,216 | 3/1989 | Bishop et al. | 364/200 |

Primary Examiner—Gareth D. Shaw
Assistant Examiner—Paul Kulik
Attorney, Agent, or Firm—Marshall, O'Toole, Gerstein, Murray & Bicknell

[57] ABSTRACT

A control and arbitration unit for use in a remote terminal coupled to a system bus over which data encoded in military standard 1553B format is transmitted manages the flow of data between a local processor, a remote terminal interface coupled to the system bus and a local memory so that data transfers occur in an orderly fashion.

13 Claims, 15 Drawing Sheets

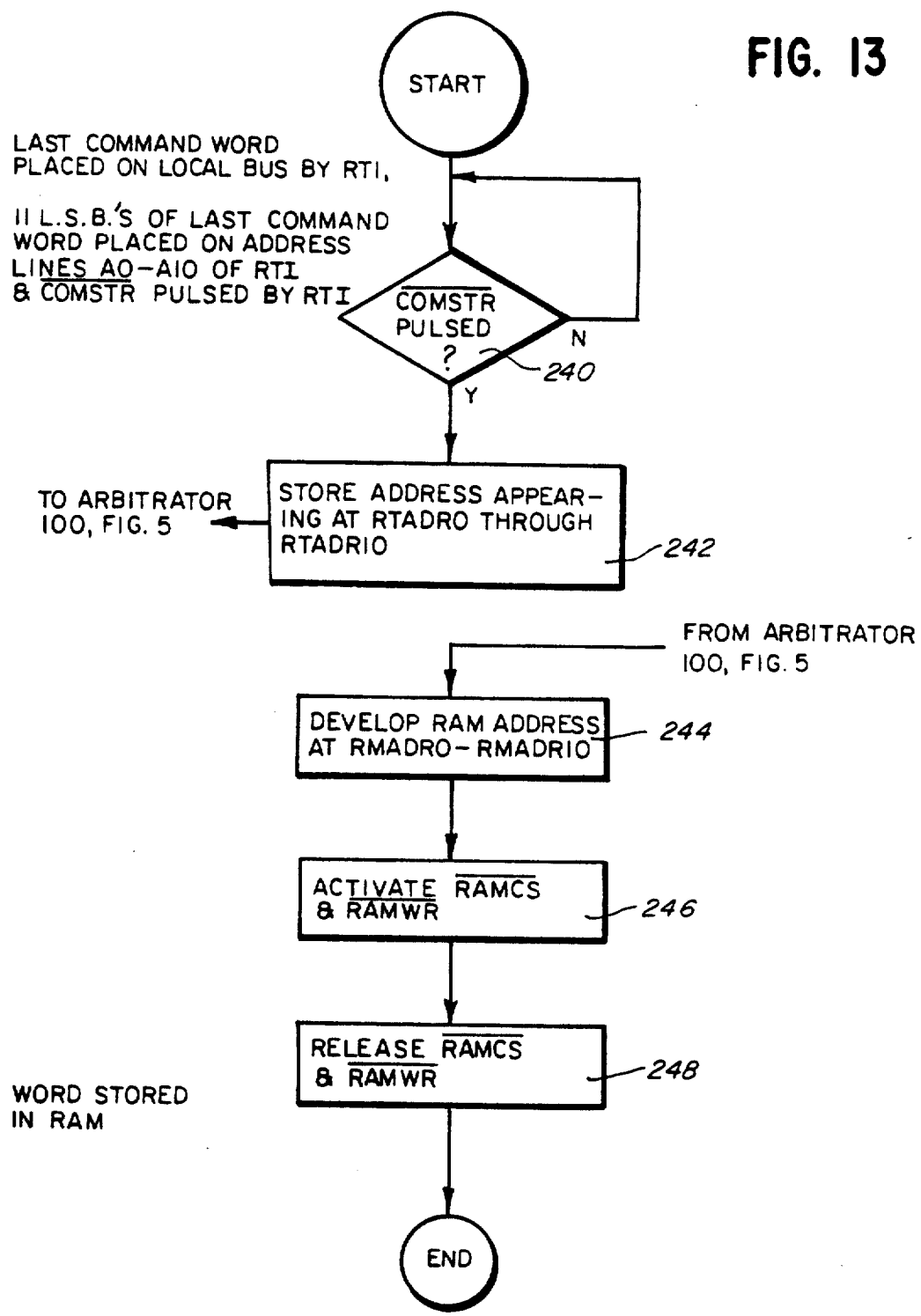

1

CONTROL AND ARBITRATION UNIT

This application is a continuation of application Ser. No. 07/138,202, filed Dec. 28, 1987, now abandoned.

BACKGROUND OF INVENTION

The present invention relates generally to circuits for managing the transfer of data between data-handling devices, and more particularly to a control and arbitration unit for controlling data flow between components of a remote terminal coupled to a system bus.

BACKGROUND ART

Many data processing systems include multiple processors which are interconnected by buses to one or more memories. For example, Tetrick et al U.S. Pat. No. 4,570,220 discloses a data processing system having a plurality of primary processors and peripheral devices which are interconnected by serial and parallel buses. Each primary processor communicates over a local bus with one or more memories or secondary processors. I/O logic circuits interconnect the local buses and the system buses.

Treen U.S. Pat. No. 4,495,567 discloses a multiple-processor, multiple-memory control system having a plurality of processors each connected by a local bus to an associated memory. The local buses are interconnected by a connecting bus which is controlled by a bus controller. Each processor is capable of accessing any one of the memories under control of the bus controller.

Data processing systems utilizing multiple processors and multiple memories or peripheral devices must utilize some form of control for allocating processor requests for access to the memories or peripheral devices so that data is passed between devices in an orderly fashion. Patents disclosing circuits for arbitrating requests for access by one or more processors to one or more memories include Finger et al U.S. Pat. No. 4,499,538, Tokita et al U.S. Pat. No. 4,214,305, Capizzi et al U.S. Pat. No. 4,621,342, Carey et al U.S. Pat. No. 4,535,330, DeWoskin U.S. Pat. No. 4,586,128, Lockwood et al U.S. Pat. No. 4,597,054, Caprio et al U.S. Pat. No. 4,556,953, Hauja U.S. Pat. No. 4,384,323, Adcock U.S. Pat. No. 4,453,214, Durvasula et al U.S. Pat. No. 4,245,303 and Flahive et al U.S. Pat. No. 4,449,183.

A further example of a multiple-processor, multiple-memory system is one in which a series of remote terminals are interconnected by a system bus over which is transmitted serial data encoded in a military standard 1553B (MIL-STD 1553B) protocol. Each remote terminal includes a remote terminal interface (RTI) manufactured by United Technologies under part number UT1553B. The remote terminal further includes a local processor and a local memory innerconnected by a local bus. Data transfers among the RTI, the local processor and the local memory could be managed by the local processor However, this imposes a substantial burden on the local processor and thus limits the local processing capability available at the remote terminal.

SUMMARY OF INVENTION

In accordance with the present invention, a control and arbitration unit designed for use in a remote terminal coupled to a system bus over which MIL STD 1553B data is transmitted assumes the arbitration and sequencing functions otherwise handled by the local processor to thereby manage the flow of data among the components of the remote terminal.

More specifically, an improvement in a remote terminal having a remote terminal interface (RTI) which communicates with a system bus, a local processor and a local memory comprises a control and arbitration unit (CAU) for managing data flow between the RTI, the local processor and the local memory. The CAU includes memory address inputs for receiving a signal representing a memory location of the local memory to be accessed, memory address outputs coupled to the memory for transmitting signals to the memory which cause accessing of a memory location in response to the signals at the memory address inputs, data inputs coupled to the local processor for receiving data transmitted thereby and data outputs coupled to a local bus. The local bus is also coupled to the local memory and to a series of data input/output (I/O) lines of the RTI. Data may be transferred under control of the CAU between the system bus and the local memory via the RTI data I/O lines and the local bus and data may be transferred from the local processor to the local memory via the CAU data inputs, data outputs and the local bus. Data may also be directly transferred from the local memory to the local processor over the local bus under control of the CAU.

The CAU also includes means for writing data supplied by the local processor into a control register in the RTI. Such means include means for determining whether the data supplied by the local processor is different than the data which was last stored in the control register and means for storing the data in the register only if the data is different. The CAU may also set a failure bit stored by the RTI control register upon detection of a failure in the remote terminal. When the failure subsequently clears, the failure bit is reset by the CAU.

The CAU is also capable of reading data in command and system registers in the RTI under control of the local processor and can cause storage of the data in the command register in the local memory.

The CAU of the present invention assumes the arbitration and sequencing functions otherwise handled by the local processor and hence, greater processing power is available for other tasks.

BRIEF DESCRIPTION OF THE DRAWINGS

FIG. 13 is a flow chart illustrating the programming executed by the CAU to transfer data from the RTI command register to the local memory.

DESCRIPTION OF THE PREFERRED EMBODIMENT

Figure 1:
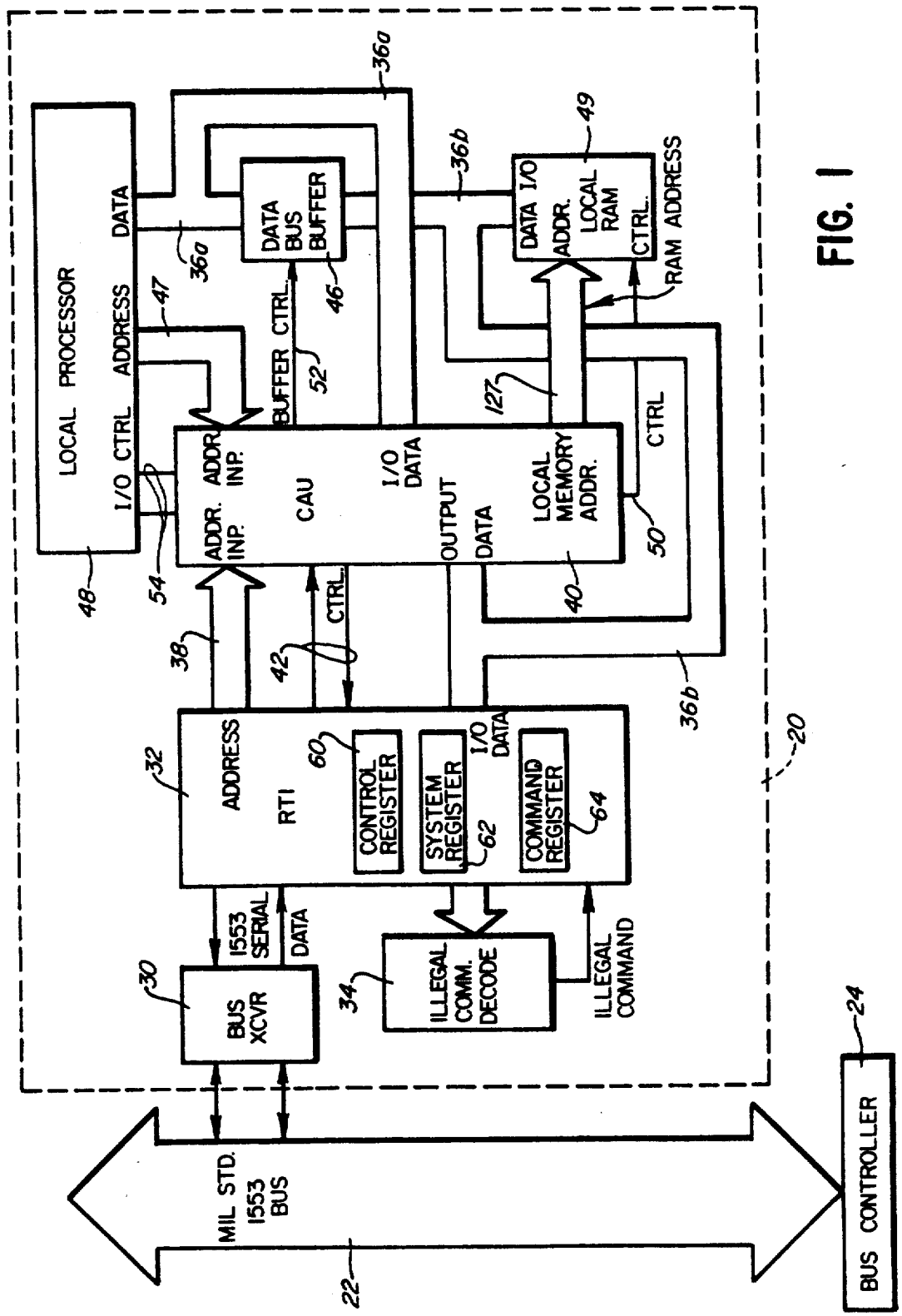
FIG. 1 is a block diagram illustrating a remote terminal coupled to a system bus.

Referring now to FIG. 1, a remote terminal 20 is coupled to a system bus 22 which is in turn controlled by a bus controller 24. A number of other terminals or other data handling devices may be coupled to the bus 22 and may be accessed in a controlled fashion by the bus controller 24. In the preferred embodiment, the data placed on the bus 22 is encoded in the MIL STD 1553B format in serialized form.

The remote terminal 20 includes a bidirectional bus transceiver 30 which acts as an interface between the system bus 22 and a remote terminal interface (RTI) 32. The bus transceiver 30 comprises a level translator which shifts signal levels on the system bus 22 to the levels required by the RTI 32, and vice versa.

The RTI 32 is a commercially available device manufactured by United Technologies Microelectronics Center, a division of United Technologies, Corp. under part No. UT1553B. The RTI 32 communicates with an illegal command decoder chip 34 which senses when an illegal command has been issued over the system bus 22 and disables the RTI to prevent faulty operation in response to an illegal command.

The RTI 32 is coupled to and communicates with a first local bus 36a via a set of I/O data lines. As noted in greater detail hereinafter the first local bus 36a and a second local bus 36b are coupled to several other components in the remote terminal.

A series of address output lines of the RTI 32 are coupled by an address bus 38 to a first set of address input lines of a control and arbitration unit (CAU) 40 according to the present invention. In addition, control signals are passed over lines 42 between the RTI and the CAU.

The CAU includes a series of output data lines which are coupled to the local bus 36b, a series of I/O data lines which are coupled by the local bus 36a to a data bus buffer 46, a second set of address input lines 47 which receive address information from a local processor 48 and a set of local memory address lines 127 which are coupled to address inputs of a local memory which may be, for example, a random access memory (RAM) 49. Control signals for the local memory are provided by the CAU over a series of control lines 50. The CAU also controls the data bus buffer 46 over a buffer control line 52 and manages the flow of data with the local processor 48 over I/O control lines 54.

The local RAM includes a series of data I/O lines which are coupled to the local bus 36b. Communication over the local bus 36b is bidirectional between the RTI 32 and the local RAM 49 so that data may be passed directly therebetween. Data flow may also take place from the local RAM 49 to the local processor 48 via the data bus buffer 46. The buffer 46 is utilized, in the preferred embodiment, inasmuch as the RAM 49 is a device which operates at signal levels different than the local processor 48 and the CAU 40. It is envisioned, however, that circuits could be used which operate at the same signal levels, in which case the data bus buffer 46 is not necessary and the first and second local buses would comprise a single local bus.

Data flow between the local memory 49 and the local processor 48 or the CAU 40 through the buffer 46 is unidirectional. Data flow from the local processor 48 to the local RAM 49 is effected via the CAU 40 and the local bus 36b while data communication from the CAU 40 to the RAM 49 occurs directly over the local buses 36b and 36a.

As should be evident from the foregoing, data transfer can occur between the system bus 22 and the RAM 49 or between the local processor 48 and the RAM 49. Further, the RTI 32 includes a control register 60, a system register 62 and a command register 64 which can be accessed by the local processor 48. The contents of the command register may be written to a memory location in the local memory 49 and one bit of the control register 60 may be set or reset by the CAU 40, as noted in greater detail hereinafter.

In addition to the sequencing functions which permit communication among the various circuits of the remote terminal and the system bus 22, the CAU 40 implements an arbitration function to manage requests for data transfer. In the preferred embodiment, the CAU arbitrates requests for data transfer on a priority basis, although a different type of arbitration scheme may be implemented, such as a ring-type scheme. Inasmuch as the arbitration function does not form any part of the present invention, it will not be described in greater detail.

Figure 2B:
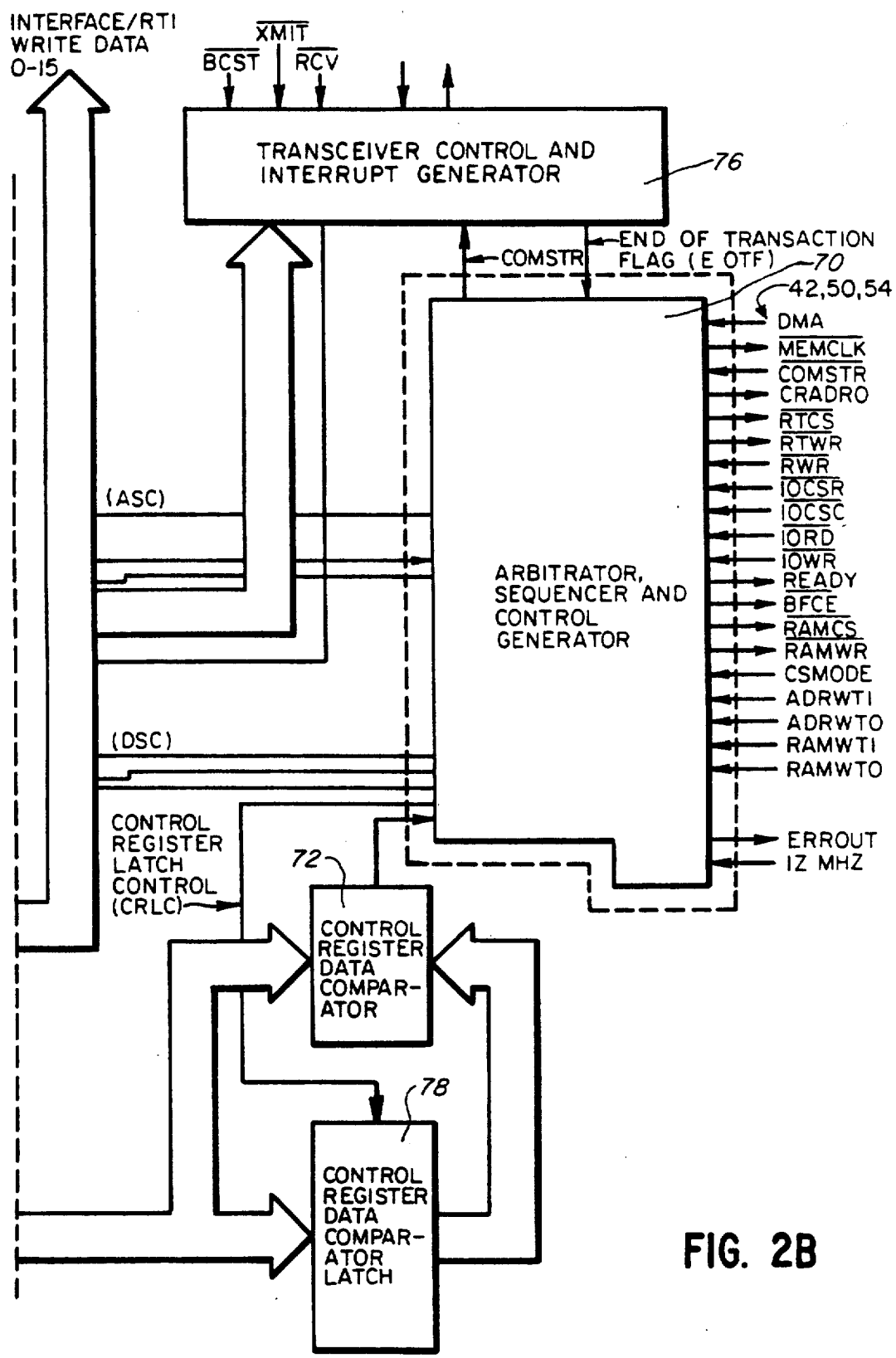
FIGS. 2A and 2B when joined along the dashed lines, comprise a generalized block diagram of the control and arbitration unit (CAU) shown in FIG. 1.
Figure 2A:
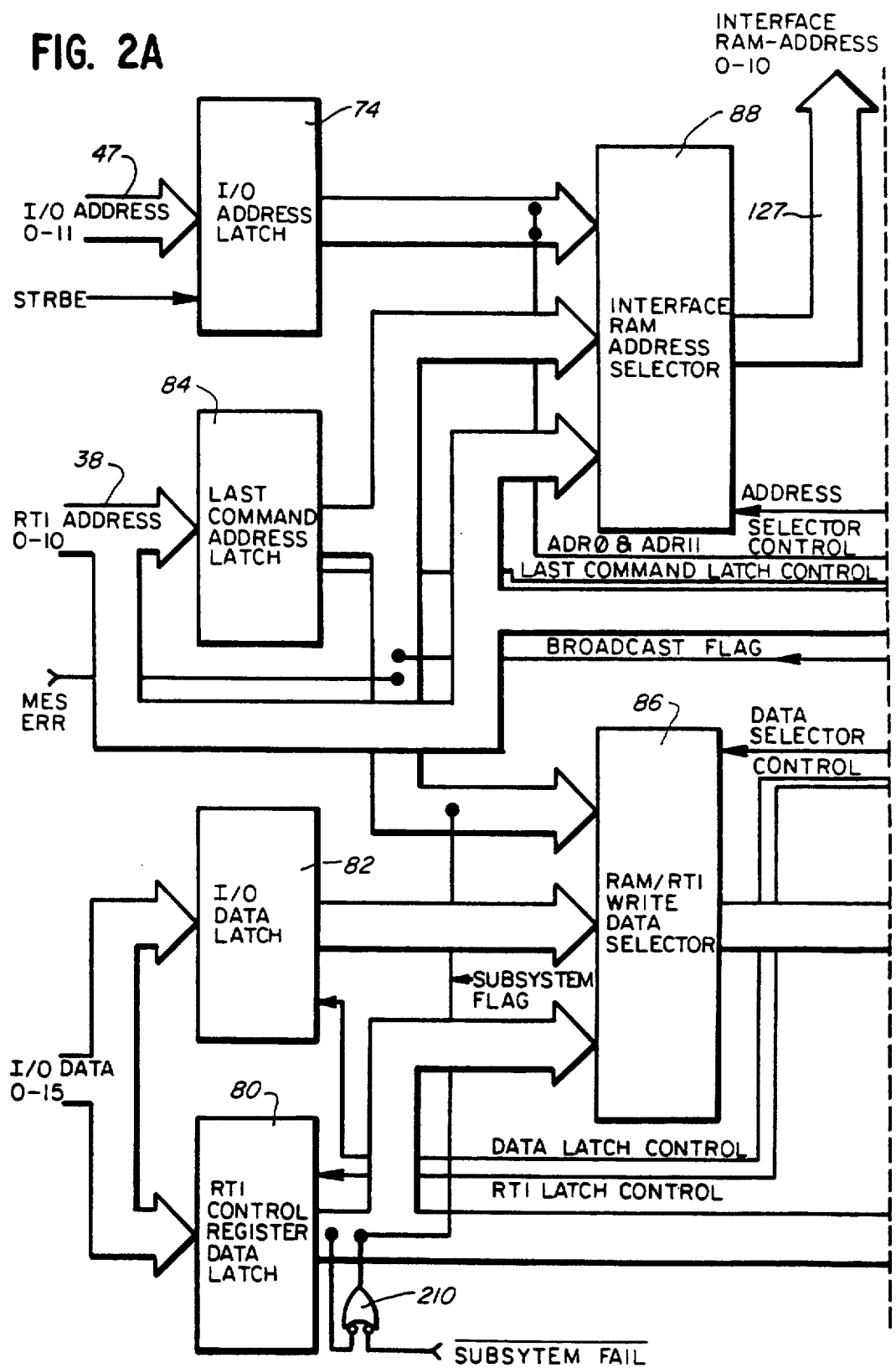

Referring now to FIG. 2, the CAU 40 is shown in block diagram form and includes an arbitrator, sequencer and control generator 70 which undertakes the arbitration and sequencing functions. The generator 70 is responsive to several circuits, including a control register data comparator 72 and I/O address latch 74 and a transceiver control and interrupt generator 76. The generator 70 is further responsive to several control signals which are described in greater detail hereinafter.

The generator 70 controls several latches including a control register data comparator latch 78, an RTI control register data latch 80, an I/O data latch 82 and a last command address latch 84. These circuits store data or addresses as needed by the CAU 40. In addition, the generator 70 controls a RAM/RTI write data selector 86, an interface RAM address selector 88 and the transceiver control and interrupt generator 76.

Figure 3:
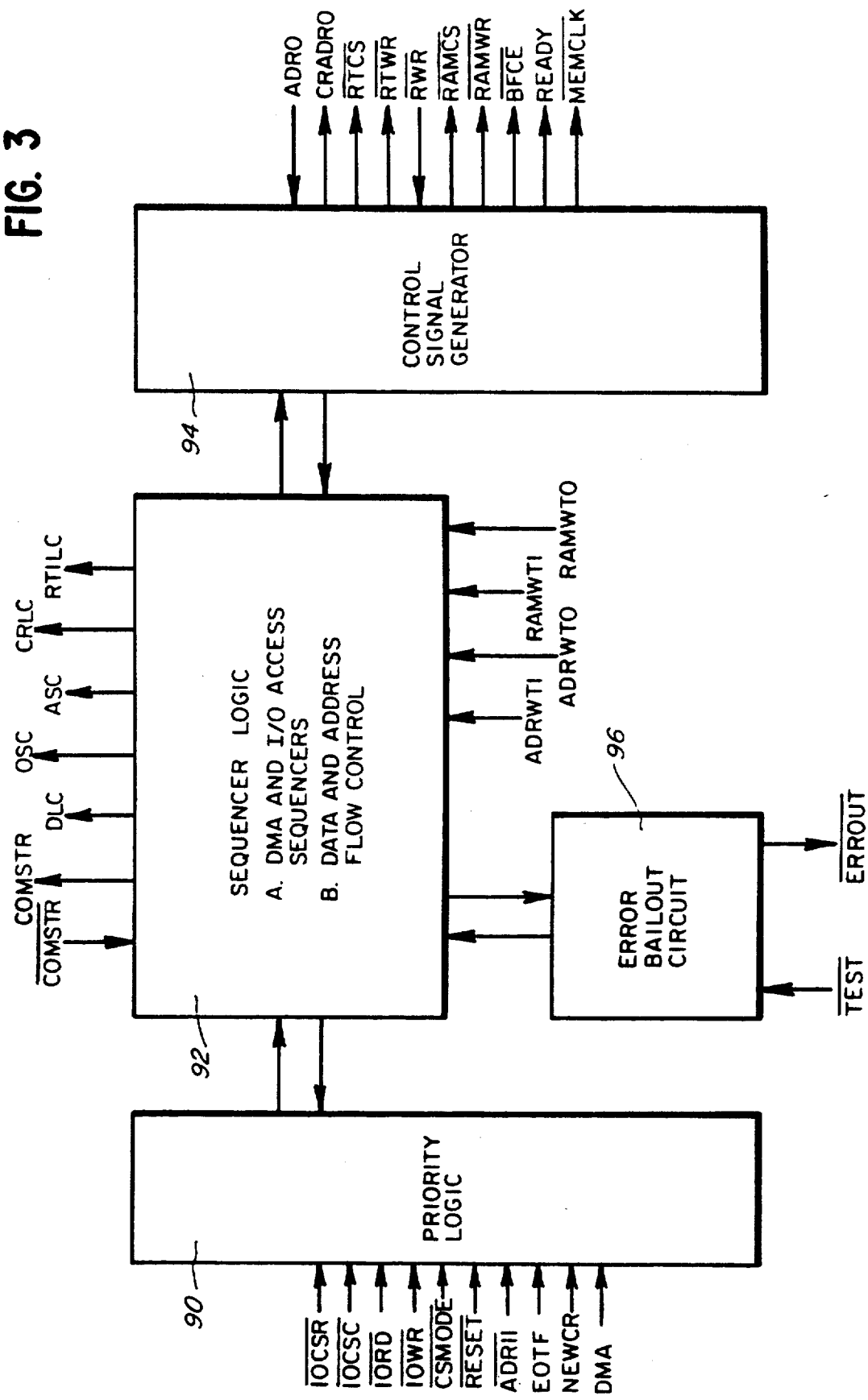
FIG. 3 is a block diagram of the arbitrator, sequencer and control generator shown in block diagram form in FIG. 2.

Referring also to FIG. 3, the arbitrator, sequencer and control generator 70 comprises a priority logic circuit 90 which accomplishes the arbitration function, a sequencer logic circuit 92 which manages the flow of data and addresses among the various circuits, a control signal generator 94 which develops and is responsive to control signals within the remote terminal and an error bail-out circuit 96 which implements an error recovery routine.

Figure 5:
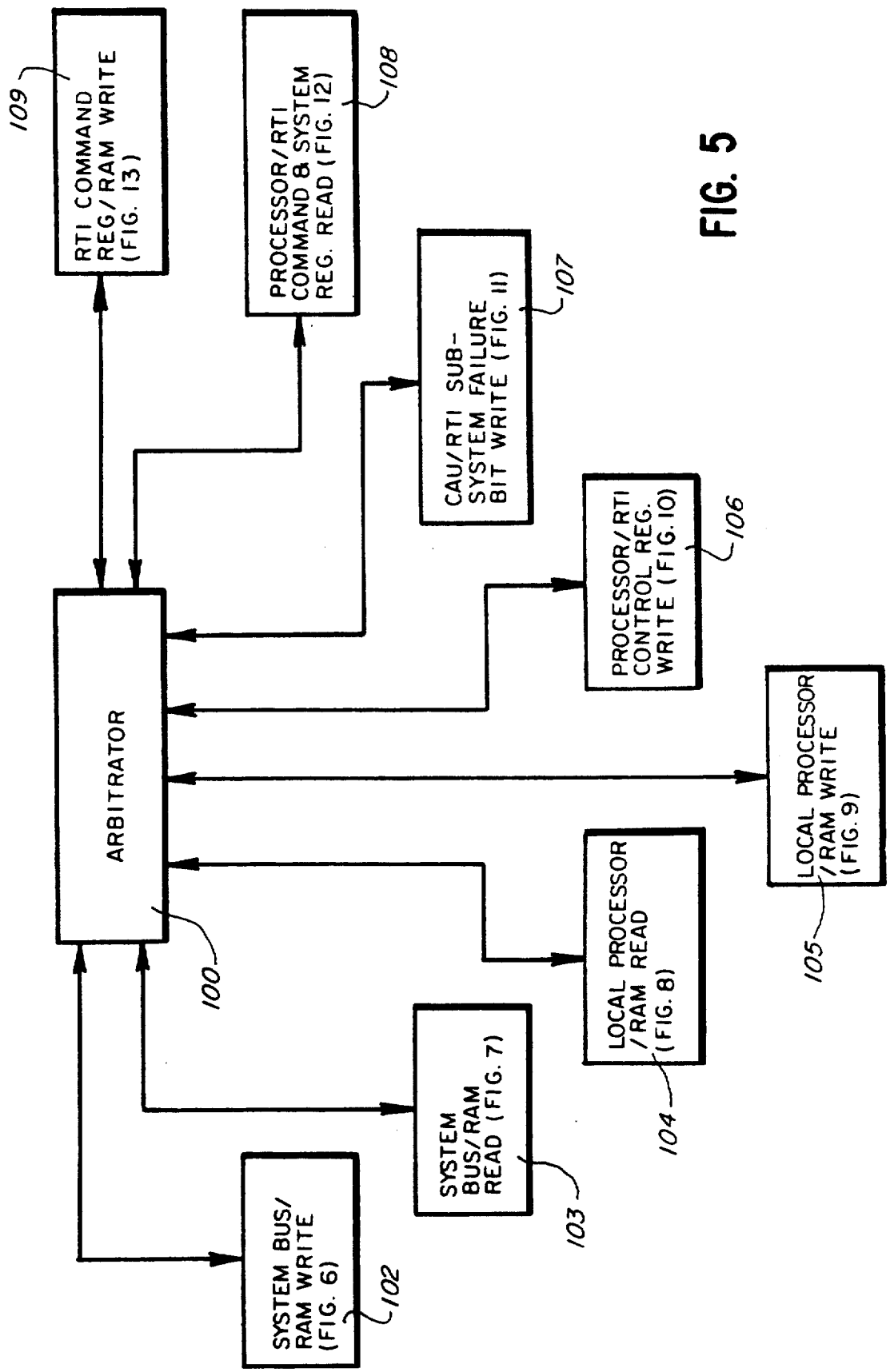
FIG. 5 is a flow chart illustrating the overall programming executed by the CAU.

Referring now to FIG. 5, there is illustrated in flow chart form the overall programming of the CAU 40. It should be noted that the CAU 40 may be implemented by discrete logic components or may comprise an integrated circuit.

A block 100 (also referred to as an "arbitrator"), executes an arbitration scheme which arbitrates between competing requests for communication between various circuits. The arbitrator 100 is capable of invoking any one of a number of routines which permit communication between circuits. These routines are illustrated by blocks 102 through 109. Once each routine has been completed, control returns to the arbitrator 100 so that the same or a different routine may be thereafter selected. The programming is executed by the arbitrator, sequencer and control generator 70 shown in FIG. 2.

FIGS. 6-13 illustrate the routines represented by the blocks 102-109 of FIG. 5. Marginal comments appear in these Figures to explain the operation of the various other components in the remote terminal, such as the RTI 32, the local processor 48 and the local RAM 49.

Figure 4A:
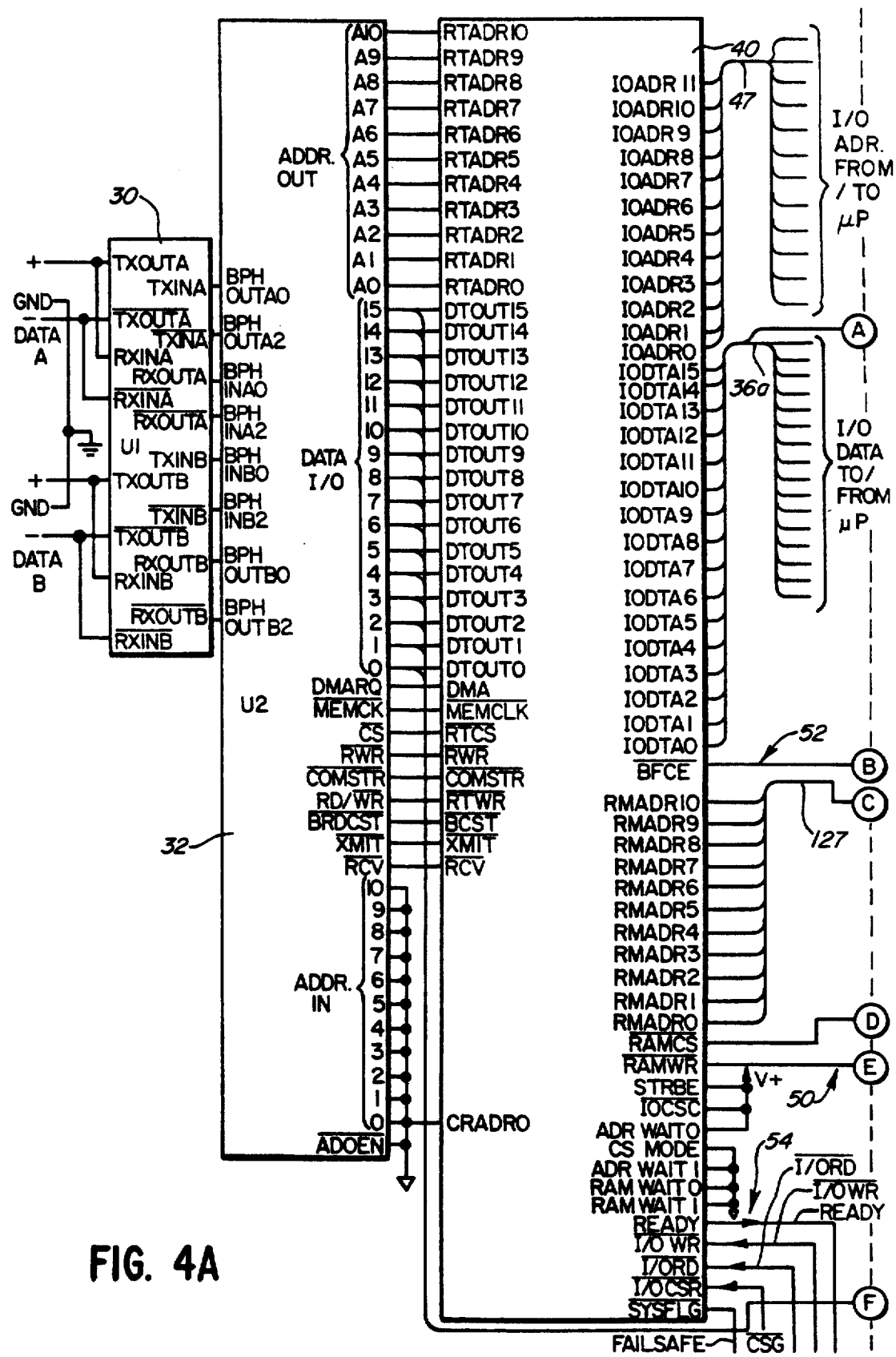
FIGS. 4A and 4B, when joined along the dashed lines with FIG. 4A on the left and FIG. 4B on the right together comprise a partial schematic diagram of the remote terminal shown in block diagram form in FIG. 1.
Figure 4B:
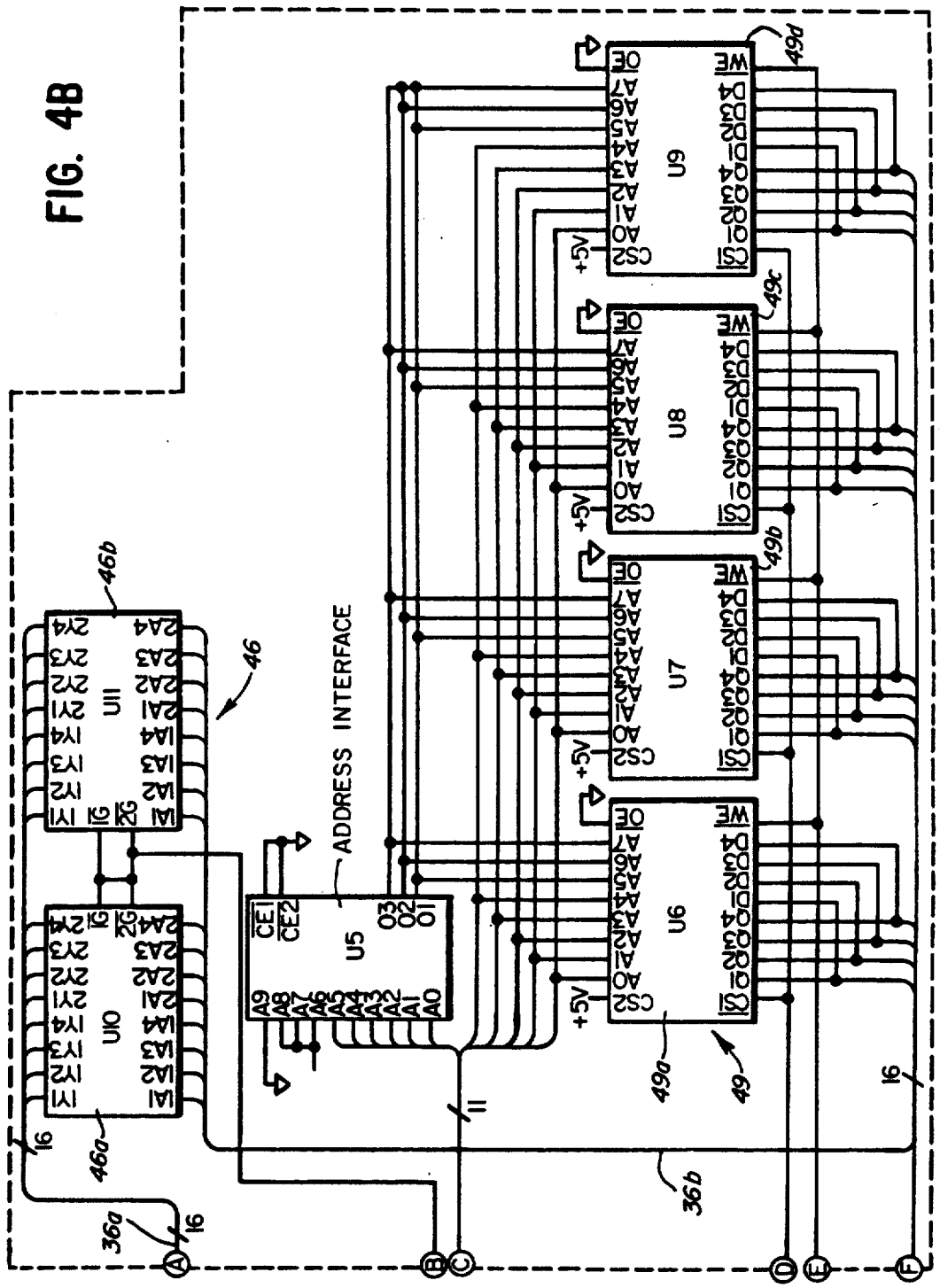
Figure 6:
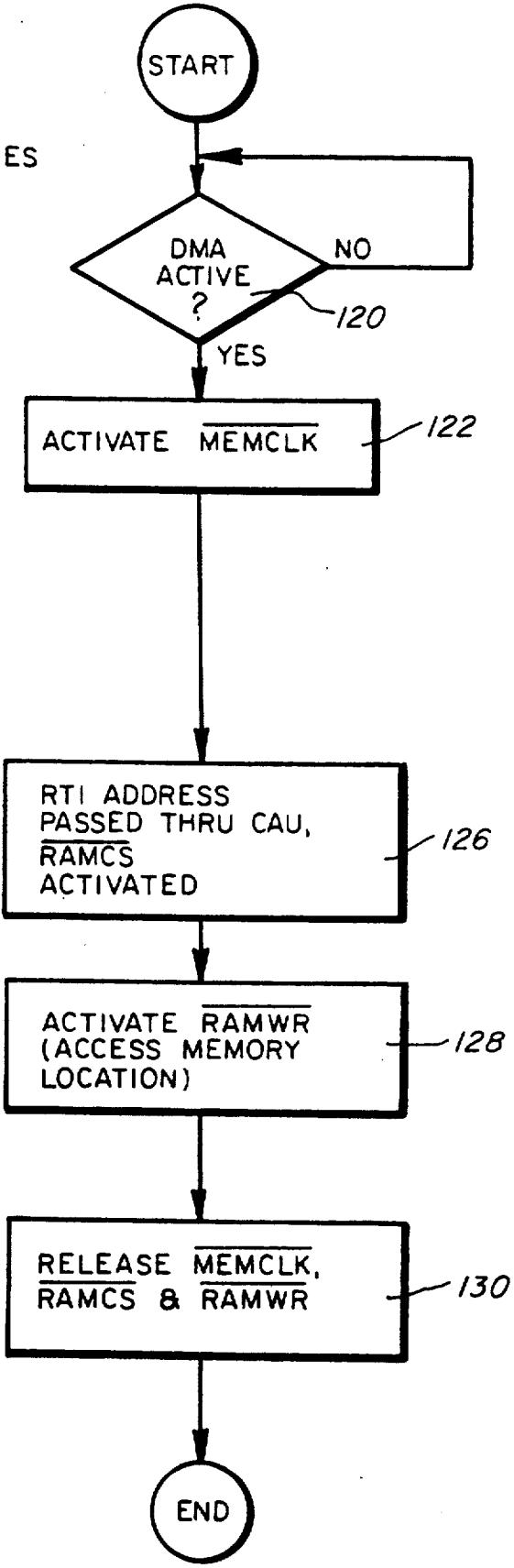
FIG. 6 is a flow chart illustrating the programming executed by the CAU for writing data provided over the system bus to the local memory.

Referring to FIG. 6 and to the schematic diagram of FIGS. 4A and 4B, the CAU 40 is capable of managing the transfer of data from the system bus 22 to the local memory 49 in response to a request issued by the bus controller 24. Incoming data from the system bus 22 is level-shifted by the bus transceiver 30 and is deserialized and verified by the RTI 32. In response to the receipt of data, the RTI activates an output DMARQ. A block 120 checks an input DMA to determine when the DMARQ output of the RTI 32 is activated. Once this condition is sensed, a block 122 activates an output $\overline{\text{MEMCLK}}$ which acknowledges the receipt of the DMARQ signal from the RTI 32. The activation of the $\overline{\text{MEMCLK}}$ output is sensed at an input $\overline{\text{MEMCK}}$ of the RTI 32. In response to receipt of this signal, the RTI 32 activates an output $\overline{\text{RWR}}$. At the same time, the data from the system bus 22 is placed on the local bus 36b and the memory address at which the data is to be stored is developed at address lines A0-A10 of the RTI 32. The address is received at a first set of address input lines RTADR0-RTADR10 of the CAU 40. Once the address is received, a block 126 places the memory address on address output lines RMADR0-RMADR10 where they are passed over the address bus 127 to memory elements 49A-49D of the local memory 49. Also, an output $\overline{\text{RAMCS}}$ is activated. Control then pauses for a selectable length of time, following which a block 128 activates an output RAMWR so that the proper memory location is accessed in the local memory 49.

A memory address interface U5 shown in FIG. 4B may be provided in the event the CAU 40 is incapable of directly generating suitable addresses for the memory element 49A-49D. The interface is unnecessary if the CAU 40 can directly address the elements 49A-49D.

Following the block 128, the outputs $\overline{\text{RAMCS}}$ and $\overline{\text{RAMWR}}$ are released, causing the data on the local bus 36b to be stored at the accessed memory location in the local memory 49. Also, the output $\overline{\text{MEMCLK}}$ is released at this time.

Once the foregoing has been accomplished, control returns to the arbitrator 100 shown in FIG. 5.

Figure 7:
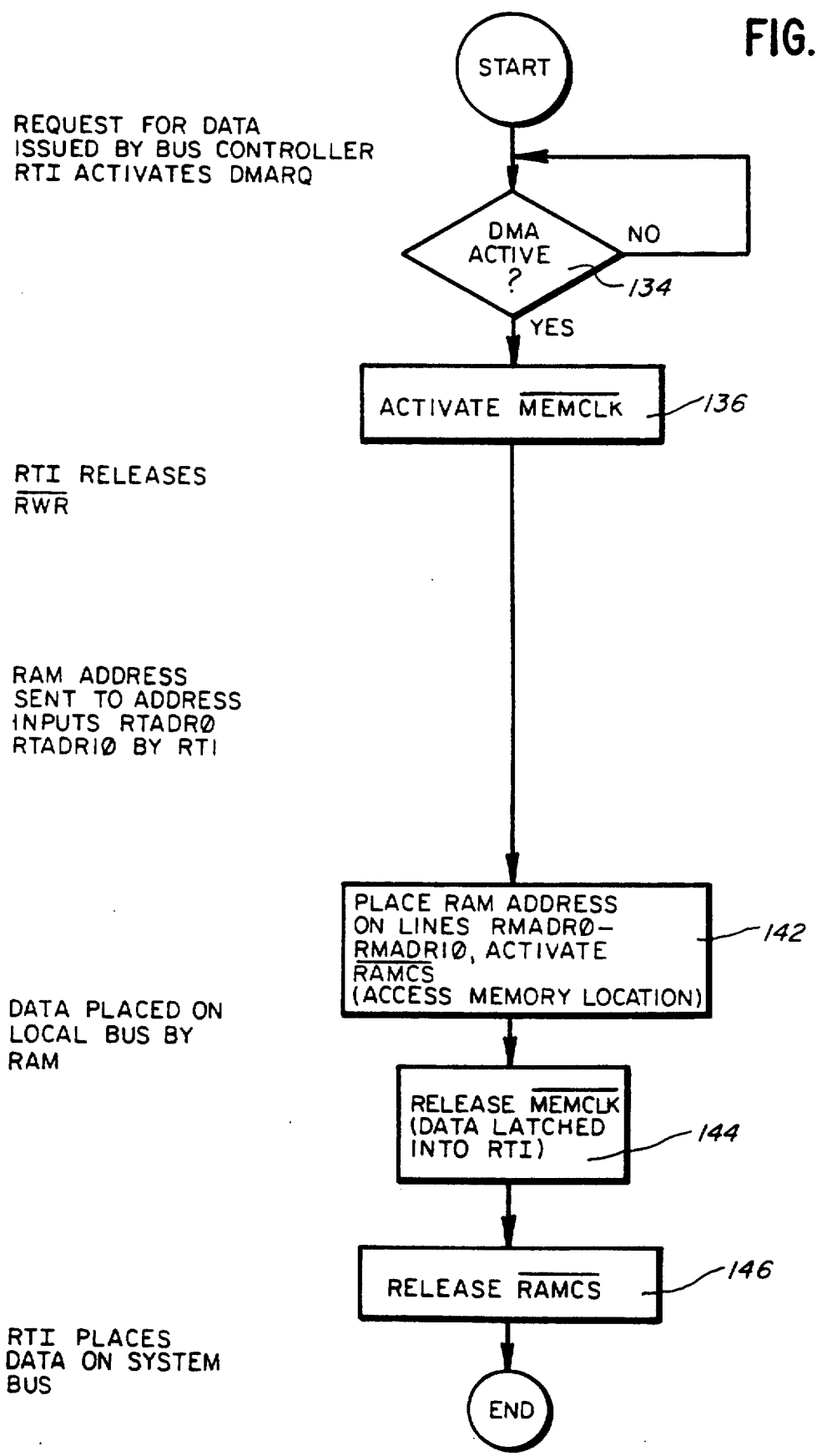
FIG. 7 is a flow chart illustrating the programming executed by the CAU to read information in the local memory and to provide such information over the system bus.

FIG. 7 illustrates the steps which are undertaken by the CAU 40 to transfer data from the local memory 49 to the system bus 22. Once the bus controller 24 has issued a request for the data in the RAM at a particular memory address or location, the RTI 32 activates the output DMARQ. A block 134 checks to determine whether the DMA input of the CAU 40 is active. Once this input becomes active, a block 136 activates the output $\overline{\text{MEMCLK}}$. In response to this activation, the RTI 32 places the address of the memory location to be accessed on the address output lines A0-A10 of the RTI 32 which is coupled to the address input lines RTADR-0-RTADR10 of the CAU 40. Following the block 136 a block 142 places the RAM address on the address output lines RMADR0-RMADR10. At the same time, the output $\overline{\text{RAMCS}}$ is activated so that the proper memory location is accessed and the local memory 49 is caused to provide the contents of the accessed memory location on the local bus 36b. After a certain period of time, a block 144 releases the output $\overline{\text{MEMCLK}}$ which in turn causes the data on the local bus 36b to be latched into the RTI 32.

Following the block 144, the RTI transfers the data to the system bus 22 and the CAU releases the output $\overline{\text{RAMCS}}$.

Figure 8:
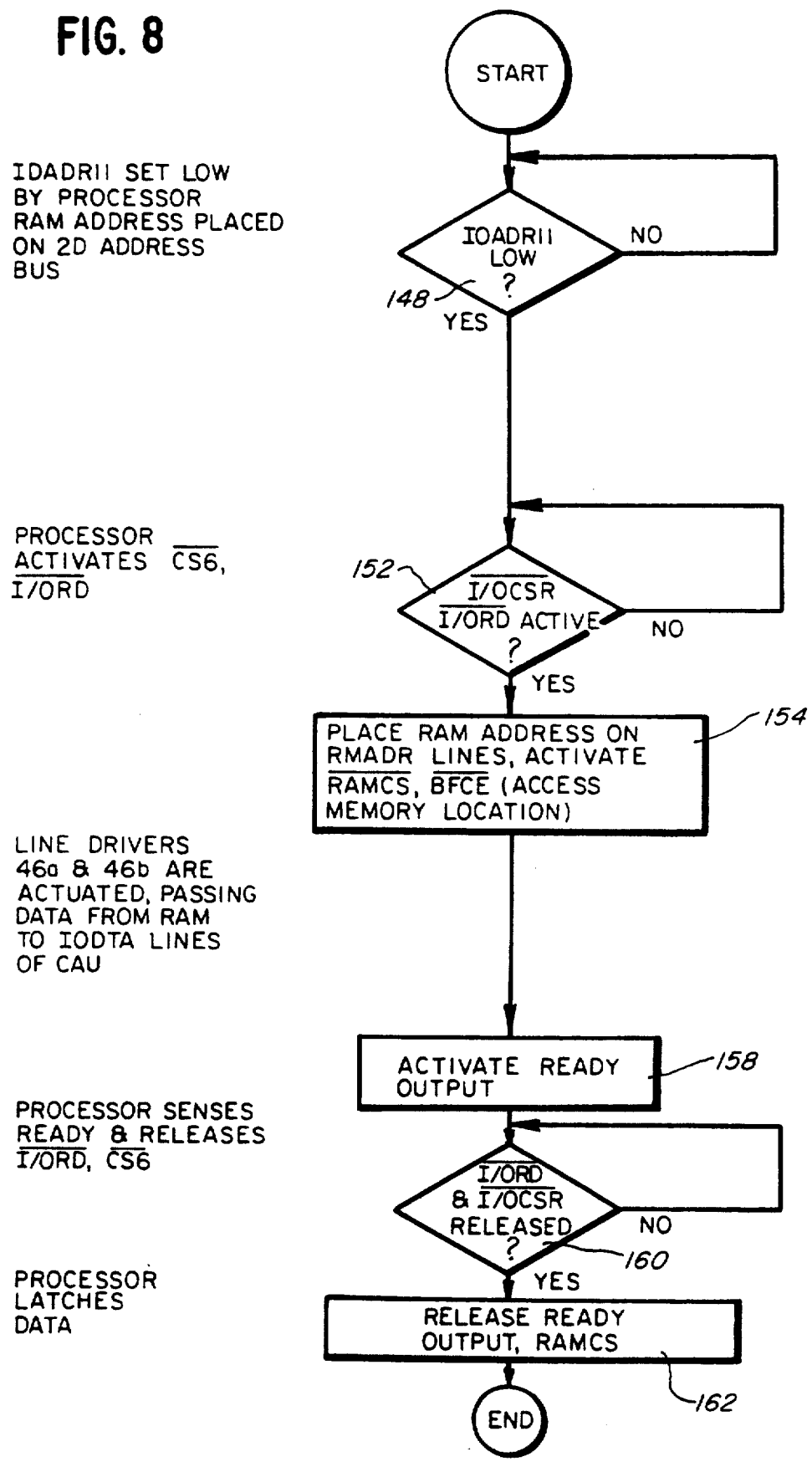
FIG. 8 comprises a flow chart illustrating the programming executed by the CAU to provide data from the local memory to the local processor.

Referring now to FIG. 8, the CAU is capable of coordinating the transfer of data from the local memory 49 to the local processor 48. In this case, a request for data stored in the local memory 49 is issued by the processor 48 which in turn sets an input line IOADR11 of the CAU 40 to a low state. This input is one of a second set of address inputs of the CAU 40 comprising input lines IOADR0-IOADR11. At the same time the input IOADR11 is set low, the address of the memory location to be accessed in the local memory 49 is placed on the second address bus 47 and is transmitted to the address inputs IOADR0-IOADR10. Once a block 148 has detected that the input IOADR11 is low, control passes to a block 152 which checks to determine whether a pair of inputs I/OCSR and I/ORD have been rendered active due to activation by the processor of its outputs $\overline{\text{CS6}}$ and I/ORD. Once this condition is sensed, a block 154 places the address of the desired memory location on the RMADR lines of the CAU 40 and outputs $\overline{\text{RAMCS}}$ and $\overline{\text{BFCE}}$ are activated. These outputs enable the proper memory element 49A-49D and enable the data bus buffer circuits 46A, 46B to pass the requested data from the memory 49 to a set of input-/output lines IODTA0-IODTA15 via the local busses 36b, 36a and the buffer circuits 46A, 46B.

Once a particular time period has passed since execution of the block 154, a block 158 activates the READY output which is in turn sensed by the processor 48. The processor then releases the outputs I/ORD and $\overline{\text{CS6}}$ which is in turn detected by a block 160. A block 162 thereafter releases the READY, $\overline{\text{RAMCS}}$ and $\overline{\text{BFCE}}$ outputs, in turn causing the processor 48 to latch the desired data and disabling the buffers 46A, 46B.

Figure 9:
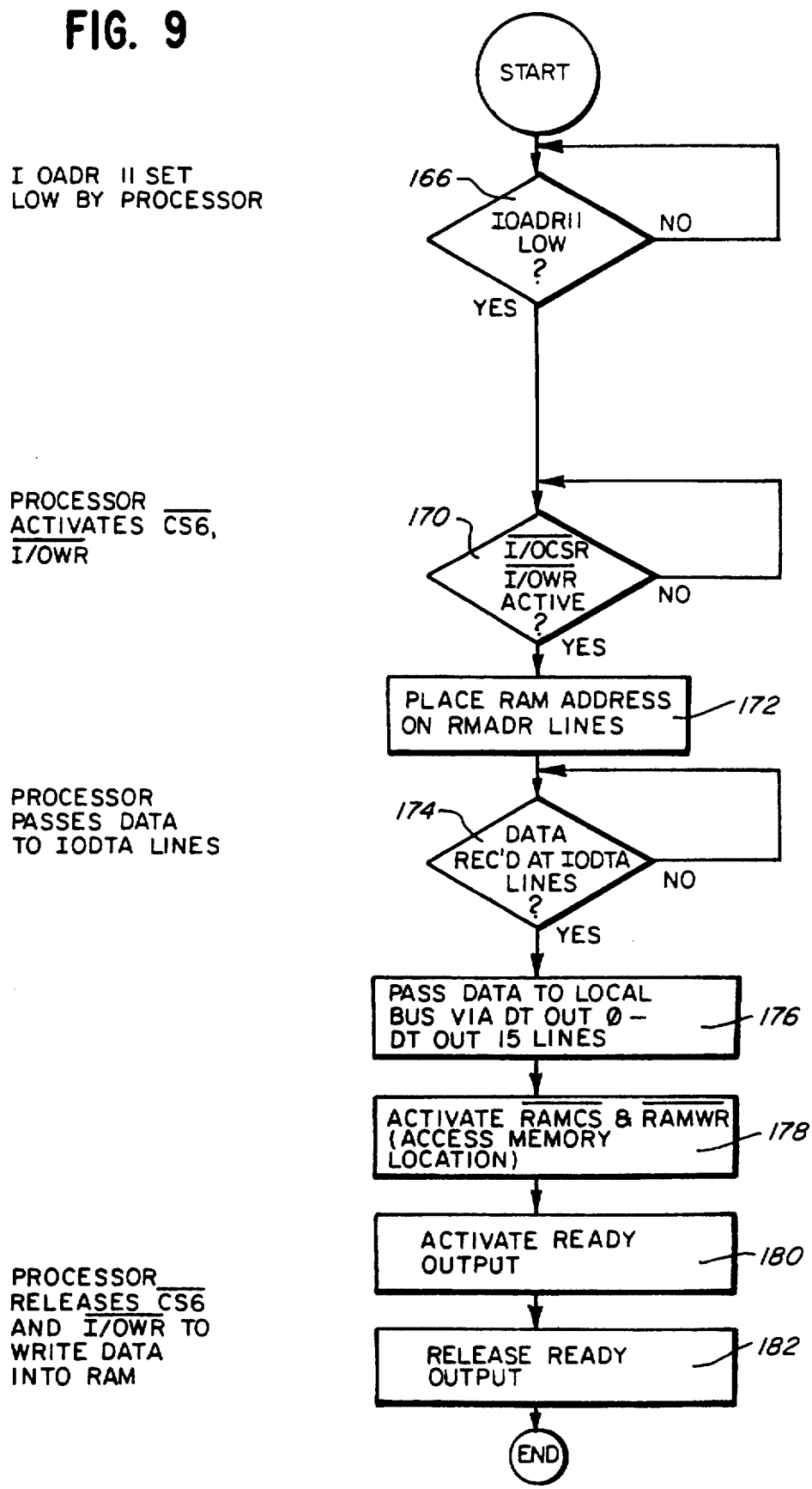
FIG. 9 comprises a flow chart illustrating the programming executed by the CAU to store information provided by the local processor in the local memory.

Referring now to FIG. 9, there is illustrated the sequence of steps undertaken by the CAU 40 to store data provided by the processor 48 in the memory 49. The request to store information in the local memory 49 is issued by the processor 48 which sets the input I/OADR11 low. After this condition is sensed by a block 166 a block 170 checks to determine that inputs I/OCSR and I/OWR have been activated by the processor 48. Once these events have occurred, the desired memory address is placed on the RMADR lines by a block 172. Control then passes to a block 176 which passes the data to be stored in the memory 49 to the local bus 36b via the DTOUT lines of the CAU 40. Control then pauses for a period of time to allow the data to settle.

Once the data has been placed on the local bus 36b, a block 178 activates the outputs $\overline{\text{RAMCS}}$ and $\overline{\text{RAMWR}}$ so that the desired memory location is accessed. The READY output is then activated, in turn causing the processor to release the outputs $\overline{\text{CS6}}$ and I/OWR so that the data is written into the memory 49.

After the data has been stored in the memory 49, a block 182 releases the READY output to complete the transfer of data into the memory 49.

Figure 10:
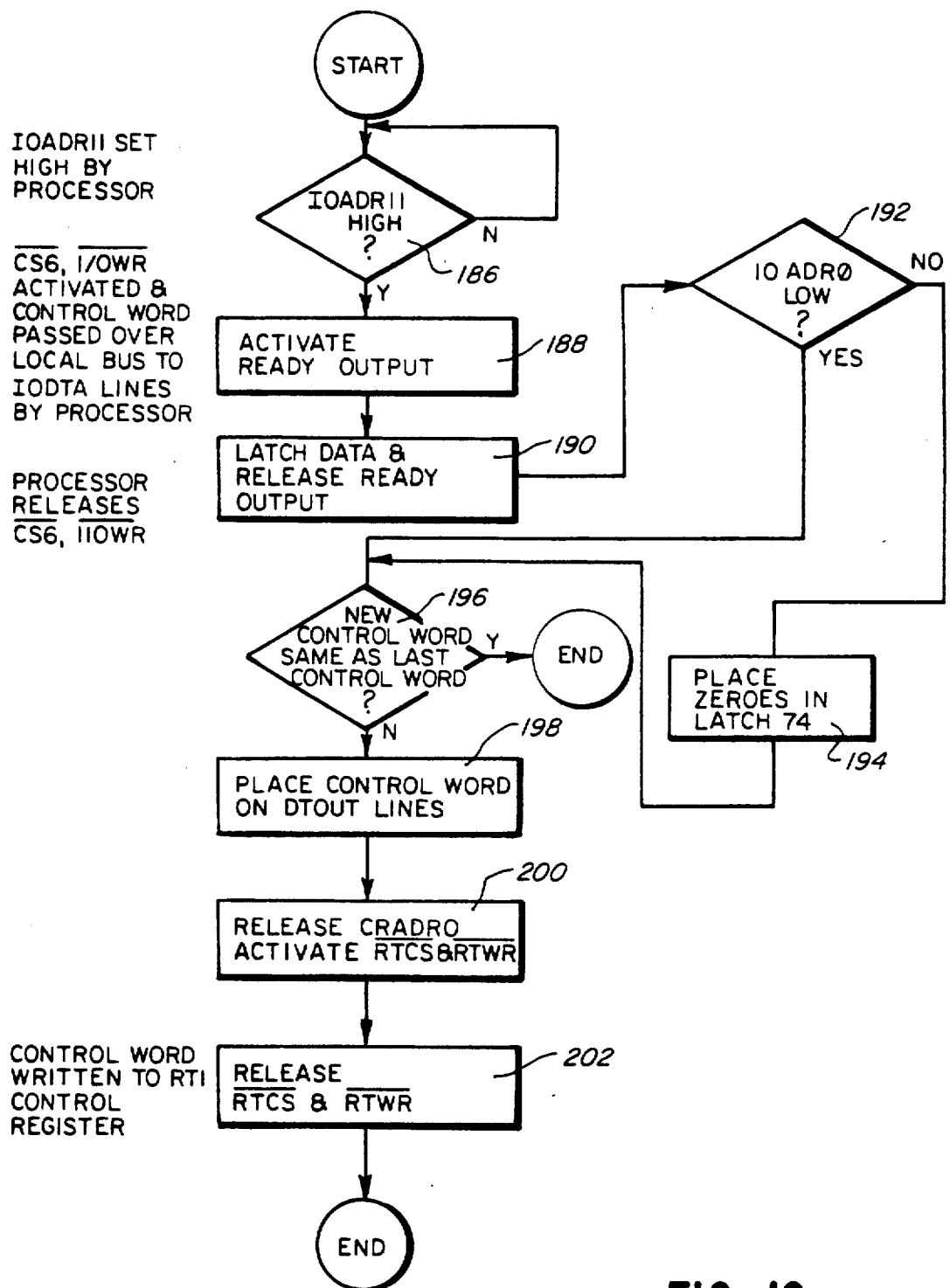
FIG. 10 comprises a flow chart illustrating the programming executed by the CAU to store information provided by the local processor in a control register in the remote terminal interface (RTI)

FIG. 10 illustrates the steps executed by the CAU 40 to effect the writing of data from the processor 48 into the RTI control register 60. The processor 48 develops a control register access request signal to inform the CAU that this data transfer is to occur. This signal is developed by setting the IOADR11 input high. Once this signal has been sensed by a block 186 and the processor 48 has activated outputs $\overline{\text{CS6}}$ and I/OWR and passed the desired data over the local bus 36a to the I/ODTA lines, the READY output of the CAU 40 is activated. Thereafter, the processor 48 releases outputs $\overline{\text{CS6}}$ and I/OWR. This release is sensed at inputs I/OCSR and I/OWR of the CAU 40, in turn causing the CAU to store the data at the IODTA line in the I/O latch 74 and to release the READY output.

A block 192 then checks to determine whether the input IOADR0 has been set low by the processor 48. If not, the processor 48 is issuing a command to clear the control register 60 and hence zeroes are placed in the latch 80. Control then passes to a block 196. On the other hand, if the input IOADR0 is low control passes directly to the block 196 which checks the output of the control register data comparator 72, FIG. 2, to determine whether the new control register word is the same as the old. If the two are the same, the process is terminated and control returns to the arbitrator 100. If, however, the new control word is not the same as the last control word (e.g. if zeroes were written into the latch 80 by the block 194), a block 198 places the new control word on the DTOUT lines of the CAU 40.

Following the blocks 194 and 198, a block 200 releases an output line CRADR0 and activates outputs $\overline{\text{RTCS}}$ and $\overline{\text{RTWR}}$. This in turn accesses the control register in the RTI 32. A block 202 then releases the outputs $\overline{\text{RTCS}}$ and $\overline{\text{RTWR}}$ so that the control word is latched into the RTI control register 60.

Figure 11:
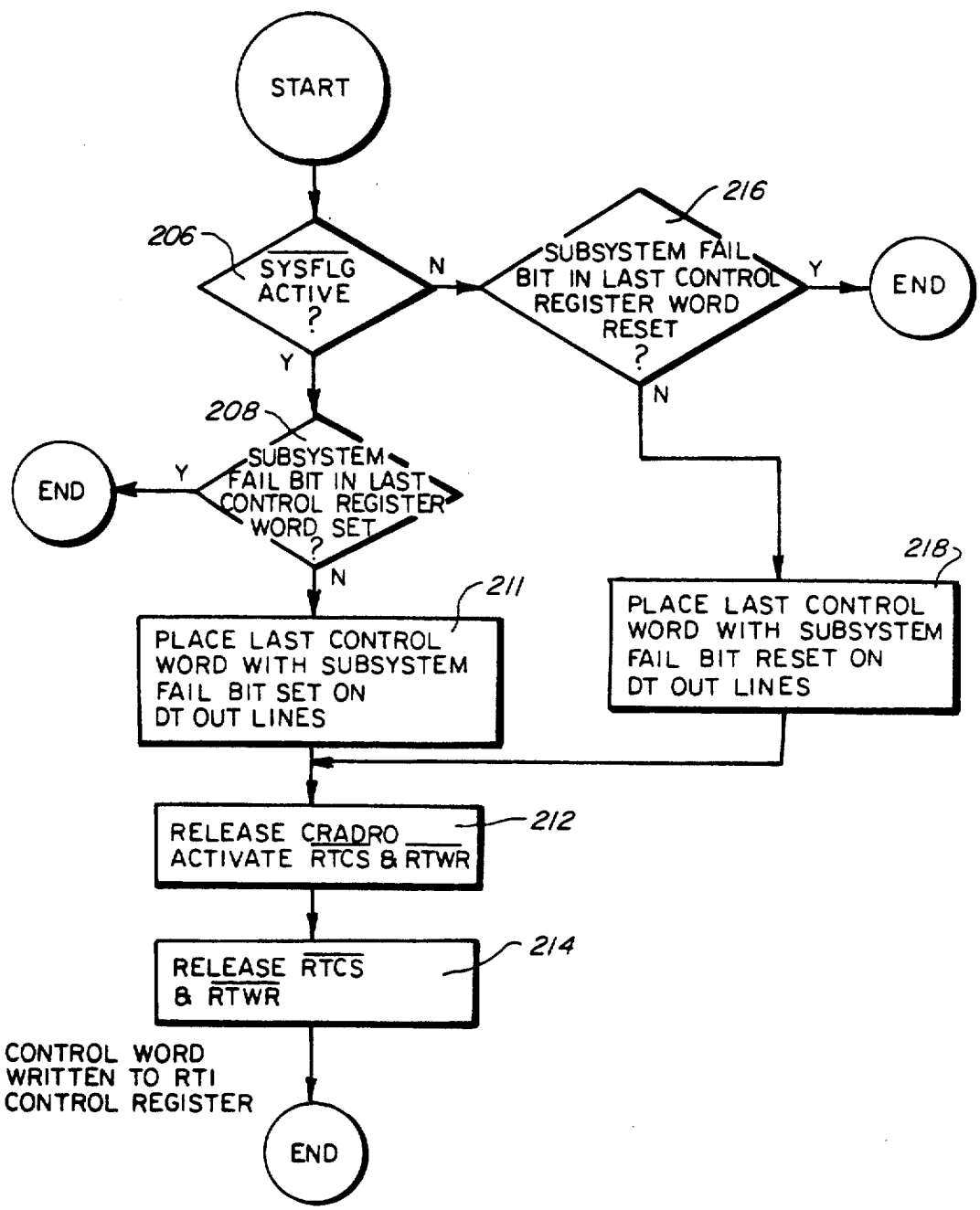
FIG. 11 is a flow chart illustrating the programming executed by the CAU for setting or resetting a subsystem failure bit in the control register in the RTI.

FIG. 11 illustrates a procedure whereby a sensed failure in one or more of the remote terminal components results in the setting of a subsystem fail bit which is stored in the RTI control register 60. The failure may comprise, for example, a timing out of a watchdog timer of the processor 48. Information pertaining to the presence of a failure in one of the remote terminal components is received by the CAU 40 at an input $\overline{\text{SYSFLG}}$. The routine begins at a block 206 which checks to determine whether this input is active. If so, a block 208 checks the output of an OR gate 210, FIG. 2, which indicates whether the subsystem fail bit in the last control register word was set. If so, control returns to the arbitrator 100 without further action since it has been determined that the subsystem failure bit should be set when in fact it is already so.

On the other hand, if the block 208 determines that the subsystem fail bit in the last control register word has not been set, control passes to a block 211 which places the last control word with the subsystem fail bit set on the DTOUT lines of the CAU 40.

A block 212 then releases the output CRADR0 and activates the outputs $\overline{\text{RTCS}}$ and $\overline{\text{RTWR}}$. The outputs $\overline{\text{RTCS}}$ and $\overline{\text{RTWR}}$ are subsequently released by block 214 to cause the new control word to be written into the RTI control register.

If the block 206 determines that the input $\overline{\text{SYSFLG}}$ is not active, a block 216 checks the output of the OR gate 210, FIG. 2., to determine whether the subsystem fail bit in the last control register word was reset. If so, control returns directly to the arbitrator 100 since it has been determined that the subsystem fail bit should be reset when in fact it is already so. On the other hand, if the block 216 determines that the last control register word subsystem fail bit has not been reset, a block 218 places the last control word with the subsystem fail bit reset on the DTOUT lines of the CAU 40.

Following the block 218, control passes to the blocks 212 and 214 which writes the new control word into the RTI control register 60.

Figure 12:
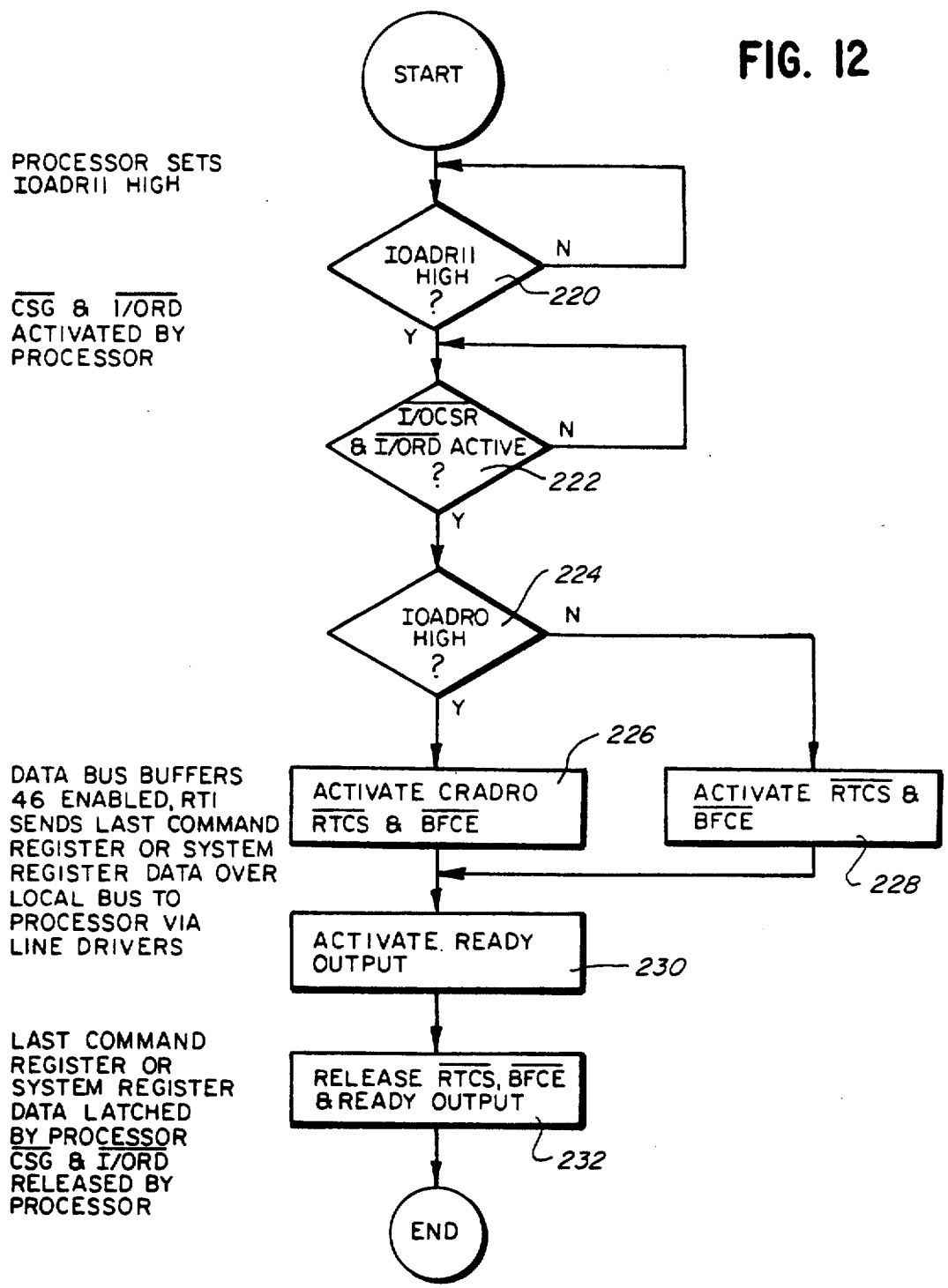
FIG. 12 comprises a flow chart illustrating the programming executed by the CAU for providing data in command and system registers in the RTI to the local processor.

Referring now to FIG. 12, there is illustrated the programming for allowing the processor 48 to read the contents of the command and system registers of the RTI 32. This data transfer is signaled by the processor 48 which sets the input IOADR11 high. Once this high state signal has been sensed, a block 222 checks to determine whether the inputs I/OCSR and I/ORD have been activated by the processor 48. Upon detection of this occurrence, a block 224 senses the state of the input IOADR0. If this input is high, control passes to a block 226 which activates the outputs CRADR0, $\overline{\text{RTCS}}$ and $\overline{\text{BFCE}}$. This in turn accesses the command register in the RTI 32.

On the other hand, if the block 224 determines that the state of the signal at the IOADR0 input is low, a block 228 activates only the outputs $\overline{\text{RTCS}}$ and $\overline{\text{BFCE}}$ so that the system register 62 in the RTI 32 is accessed.

Once the proper register 62, 64 has been accessed and the data bus buffers 46A, 46B have been enabled by activation of the output $\overline{\text{BFCE}}$, the RTI places the last command register data or system register data on the local bus 36b. This data is transferred to the processor via the buffers 46A, 46B and the local bus 36a. A block 230 then activates the READY output so that the last command register data or system register data is latched by the processor 48. Once this latching has occurred, the outputs $\overline{\text{CS6}}$ and I/ORD of the processor 48 are released, in turn causing release of the outputs $\overline{\text{RTCS}}$, $\overline{\text{BFCE}}$ and READY by a block 232.

Following the block 232, control returns to the arbitrator 100, FIG. 5.

FIG. 13 illustrates the procedure whereby data from the RTI command register 64 may be stored in the local memory 49. At this point, it should be noted that the command word in the register 64 is 16 bits long. The 11 least significant bits of the command word contain information representing the memory address at which the command word is to be stored in the local memory 49. The remaining five bits include two spares which are unused and three bits comprising a subsystem fail flag, a broadcast command bit which is set high by the bus controller 24 when all of the devices connected to the bus 22 are to receive a command from the bus controller 24 and an illegal command bit which is set high when an illegal command is received, as detected by the illegal command decoder 34 or an internal illegal command checking mechanism (not shown) within the RTI 32. The last command word is placed on the local bus 36b by the RTI 32 and the 11 least significant bits of the command word are placed on the address lines A0-A10 of the RTI 32 so that they are transferred to the RTADR address input lines of the CAU 40. At this time, an output $\overline{\text{COMSTR}}$ is pulsed by the RTI 32 and one of three outputs $\overline{\text{BRDCST}}$, $\overline{\text{XMIT}}$ and $\overline{\text{RCV}}$ of the RTI 32 is activated. These outputs are coupled to inputs $\overline{\text{BCST}}$, $\overline{\text{EMIT}}$ and $\overline{\text{RCV}}$, respectively of the CAU 40. A block 240 pauses until an input $\overline{\text{COMSTR}}$ of the CAU 40 receives the pulse signal. A block 242 then stores the address appearing at the RTADR lines in the address latch 84 of the CAU 40.

Following the block 242, control returns to the arbitrator 100, FIG. 5, until the active output $\overline{\text{BRDCST}}$, $\overline{\text{XMIT}}$ or $\overline{\text{RCV}}$ of the RTI 32 returns to the inactive state, signifying that an end of bus data string has been received by the CAU 40. Thereafter, control passes to a block 244 which utilizes the stored 11 bits in the latch 84 to develop an address in the local memory 49 at which the command word will be stored. This address is provided at the RMADR outputs of the CAU 40. A block 246 then activates the outputs $\overline{\text{RAMCS}}$ and $\overline{\text{RAMWR}}$. These outputs are subsequently released by a block 248 to cause storage of the last command word on the local bus 36b at the desired memory location.

In addition to the foregoing functions, the CAU 40 may be designed to accomplish certain ancillary functions utilizing a series of outputs which are illustrated as being connected to either a positive voltage V+ or ground. A first ancillary function is implemented by connecting an input CSMODE to the voltage V+. This in turn causes the CAU 40 to ignore the input I/OADR11. Instead, an input I/OCSR receives signals from the local processor 48 requesting data transfer between the processor 48 and the RAM 49 and an input I/OCSC receives signals from the local processor 48 requesting data transfer between the processor 48 and the RTI registers 60, 62, 64. The use of the input I/OCSC permits different microprocessor address partitioning, if needed.

A second ancillary function is accomplished through use of an input STRBE. This input is configured to allow demultiplexing of data on a multiplexed data or address bus.

A plurality of additional inputs ADRWAIT0, ADRWAIT1, RAMWAIT0 and RAMWAIT1 may be used to tailor CAU timing to different memory access speeds. These inputs may be used to change the delays between blocks 126 and 128, 142 and 144 and 154 and 158.

The CAU of the present invention assumes many of the arbitration and sequencing functions which would normally be undertaken by the local processor 48, and hence the overhead demands placed on the processor 48 are reduced.

I claim:

1. In a remote terminal coupled to a system bus wherein the remote terminal includes a remote terminal interface (RTI) which communicates with the bus, a local processor and a local memory, the improvement comprising:
   a bus buffer; and
   a control and arbitration unit (CAU) coupled to the bus buffer for managing data flow between the RTI, the local processor and the local memory, including memory address inputs for receiving an address signal from either of the RTI and the local processor representing a memory location of the local memory to be accessed, memory address outputs coupled to the local memory for transmitting the address signal to the local memory which causes accessing of the memory location in response to the signals at the memory inputs, CAU data inputs coupled to data input/output lines of the local processor for receiving data therefrom over a first, bidirectional local bus and CAU data outputs coupled to a second, bidirectional local bus wherein the second local bus is also coupled to the local memory and to a series of data input/output (I/O) lines of the RTI whereby a first path for data is established between the system bus and the local memory via the RTI data I/O lines and the second local bus, a second path for data is established from the local processor to the local memory via the first local bus, the CAU data inputs, the CAU data outputs and the second local bus and a third path for data is established from the local memory to the local processor over the second ad first local buses via the bus buffer under control of the CAU.

2. In a remote terminal coupled to a system bus wherein the remote terminal includes a remote terminal interface (RTI) which communicates with the bus, a local processor and a local memory, the improvement comprising:
   a bus buffer; and
   a control and arbitration unit (CAU) coupled to the bus buffer for managing data flow between the RTI, the local processor and the local memory, including memory address inputs for receiving a signal from either of the RTI and the local processor representing a memory location of the local memory to be accessed, memory address outputs coupled to the local memory for transmitting signals to the local memory which causes accessing of the memory location in response to the signals at the memory inputs, CAU data inputs coupled to data input/output lines of the local processor for receiving data therefrom over a first, bidirectional local bus and CAU data outputs coupled to a second, bidirectional second local bus wherein the second local bus is also coupled to the local memory and to a series of data input/output (I/O) lines of the RTI whereby a first path for data is established between the system bus and the local memory via the RTI data I/O lines and the second local bus, a second path for data is established from the local processor to the local memory via the first local bus, the CAU data inputs, the CAU data outputs and the second local bus and a third path for data is established from the local memory to the local processor over the second and first local buses via the bus buffer under control of the CAU, wherein the RTI further includes a control register and wherein the CAU includes means for writing data supplied by the local processor into the RTI control register only if such data is different than the data already stored in the control register.

3. In a remote terminal coupled to a system bus wherein the remote terminal includes a remote terminal interface (RTI) which communicates with the bus, a local processor and a local memory, the improvement comprising:
   a bus buffer; and a control and arbitration unit (CAU) coupled to the bus buffer for managing data flow between the RTI, the local processor and the local memory, including memory address inputs for receiving a signal from either of the RTI and the local processor representing a memory location of the local memory to be accessed, memory address outputs coupled to the local memory for transmitting signals to the local memory which causes accessing of the memory location in response to the signals at the memory inputs, CAU data inputs coupled to data input/output lines of the local processor for receiving data therefrom over a first, bidirectional local bus and CAU data outputs coupled to a second, bidirectional local bus wherein the second local bus is also coupled to the local memory and to a series of data input/output (I/O) lines of the RTI whereby a first path for data is established between the system bus and the local memory via the RTI data I/O lines and the second local bus, a second path for data is established from the local processor to the local memory via the first local bus, the CAU data inputs, the CAU data outputs and the second local bus and a third path for data is established from the local memory to the local processor over the second and first local buses via the bus buffer under control of the CAU, wherein the RTI further includes a control register which stores a plurality of bits including a failure bit and wherein the CAU includes means responsive to a failure in the remote terminal for setting the failure bit without changing the remaining bits in the control register and for resetting the failure bit when the failure subsequently clears.

4. In a remote terminal coupled to a system bus wherein the remote terminal includes a remote terminal interface (RTI) which communicates with the bus, a local processor and a local memory, the improvement comprising:
a bus buffer; and
a control and arbitration unit (CAU) coupled to the bus buffer for managing data flow between the RTI, the local processor and the local memory, including memory address inputs for receiving a signal from either of the RTI and the local processor representing a memory location of the local memory to be accessed, memory address outputs coupled to the local memory for transmitting signals to the local memory which causes accessing of the memory location in response to the signals at the memory inputs, CAU data inputs coupled to data input/output lines of the local processor for receiving data therefrom over a first, bidirectional local bus and CAU data outputs coupled to a second, bidirectional local bus wherein the second local bus is also coupled to the local memory and to a series of data input/output (I/O) lines of the RTI whereby a first path for data is established between the system bus and the local memory via the RTI data I/O lines and the second local bus, a second path for data is established form the local processor to the local memory via the first local bus, the CAU data inputs, the CAU data outputs and the second local bus and a third path for data is established from the local memory to the local processor over the second and first local buses via the bus buffer under control of the CAU, wherein the RTI includes a command register and wherein the CAU includes means responsive to the local processor for retrieving the data stored in the command register and providing the retrieved data to the local processor via the first local bus.

5. In a remote terminal coupled to a system bus wherein the remote terminal includes a remote terminal interface (RTI) which communicates with the bus, a local processor and a local memory, the improvement comprising:
a buss buffer; and
a control and arbitration unit (CAU) coupled to the bus buffer for managing data flow between the RTI, the local processor and the local memory, including memory address inputs for receiving a signal form either of the RTI and the local processor representing a memory location of the local memory to be accessed, memory address outputs coupled to the local memory for transmitting signals to the local memory which causes accessing of the memory location in response to the signals at the memory inputs, CAU data inputs coupled to data input/output lines of the local processor for receiving data therefrom over a first, bidirectional local bus and CAU data outputs coupled to a second, bidirectional local bus wherein the second local bus is also coupled to the local memory and to a series of data input/output (I/O) lines of the RTI whereby a first path for data is established between the system bus and the local memory via the RTI data I/O lines and the second local bus, a second path for data is established form the local processor to the local memory via the first local bus, the CAU data inputs, the CAU data outputs and the second local bus and a third path for data is established from the local memory to the local processor over the second and first local buses via the bus buffer under control of the CAU, wherein the RTI includes a system register and wherein the CAU includes means responsive to the local processor for retrieving the data stored in the system register and providing the retrieved data to the local processor via the first local bus.

6. A control and arbitration unit (CAU) for managing the transfer of data among a remote terminal interface (RTI) coupled to a system bus over which data encoded in a military standard 1553B format is transmitted, a local memory and a local processor interconnected with the RTI and the CAU by first and second bidirectional local buses wherein the local memory is coupled by the second local bus to a plurality of data output lines of the CAU and to a plurality of input/output (I/O) lines of the RTI and wherein the local processor includes data lines coupled to data input/output (I/O) lines of the CAU by the first local bus and address lines coupled to a first set of address input lines of the CAU, the CAU further including a second set of address input lines coupled to a plurality of address output lines of the RTI, comprising:
first means responsive to a memory access request signal developed on a first line from the RTI for transferring a memory address signal from the second set of CAU address input lines to the local memory to access a memory location therein whereby data may be transferred from/to the accessed memory location over the second local bus; and
second means responsive to a memory access request signal developed on a second line from the local processor for transferring a memory address signal from the first set of CAU address input lines to the local memory to access a memory location therein whereby data may be transferred between the accessed memory location and the local processor via the local busses.

7. A control and arbitration unit (CAU) for managing the transfer of data among a remote terminal interface (RTI) coupled to a system bus over which data encoded in a military standard 1553B format is transmitted, a local memory and a local processor interconnected with the RTI and the CAU by first and second bidirectional local buses wherein the local memory is coupled by the second local bus to a plurality of data output lines of the CAU and to a plurality of input/output (I/O) lines of the RTI and wherein the local processor includes data lines coupled to data input/output (I/O) lines of the CAU by the first local bus and address lines coupled to a first set of address input lines of the CAU, the CAU further including a second set of address input lines coupled to a plurality of address output lines of the RTI, comprising:

first means responsive to a memory access request signal developed on a first line from the RTI for transferring a memory address signal from the second set of CAU address input lines to the local memory to access a memory location therein whereby data may be transferred from/to the accessed memory location over the second local bus;

second means responsive to a memory access request signal developed on a second line from the local processor for transferring a memory address signal from the first set of CAU address input lines to the local memory to access a memory location therein whereby data may be transferred between the accessed memory location and the local processor via the local buses; and means responsive to the memory access request signal from the local processor for transferring data placed on the CAU data I/O lines by the local processor to the CAU data output lines, the second local bus and the local memory.

8. A control and arbitration unit (CAU) for managing the transfer of data among a remote terminal interface (RTI) having a control register coupled to a system bus over which data encoded in a military standard 1553B format is transmitted, a local memory and a local processor interconnected with the RTI and the CAU by first and second bidirectional local buses wherein the local memory is coupled by the second local bus to a plurality of data output lines of the CAU and to a plurality of input/output (I/O) lines of the RTI and wherein the local processor includes data lines coupled to data input/output (I/O) lines of the CAU by the first local bus and address lines coupled to a first set of address input lines of the CAU, the CAU further including a second set of address input lines coupled to a plurality of address output lines of the RTI, comprising:

first means responsive to a memory access request signal developed on a first line from the RTI for transferring a memory address signal from the second set of CAU address input lines to the local memory to access a memory location therein whereby data may be transferred from/to the accessed memory location over the second local bus;

second means responsive to a memory access request signal developed on a second line from the local processor for transferring a memory address signal from the first set of CAU address input lines to the local memory to access a memory location therein whereby data may be transferred between the accessed memory location and the local processor via the local buses; and third means responsive to a control register access request signal from the local processor for transferring data placed on the CAU data I/O lines by the local processor to the CAU data output lines to thereby store such data in the RTI control register.

9. The CAU of claim 8, wherein the third transferring means includes means for storing the data in a latch prior to transfer of the data to the RTI control register.

10. The CAU of claim 9, wherein the third transferring means further includes means for comparing the data stored in the latch with the last data stored in the RTI control register and means for providing the data on the CAU data output lines only if the data stored in the latch is different than the last data stored in the RTI control register.

11. The CAU of claim 7, wherein the RTI includes a control register which stores a plurality of bits including a failure bit and wherein the CAU further includes means responsive to a failure in at least the local processor for setting the failure bit without changing the remaining bits in the control register and for resetting the failure bit when the failure subsequently clears.

12. The CAU of claim 7, wherein the RTI includes a command register and wherein the CAU includes means responsive to the local processor for retrieving the data stored in the command register and providing the retrieved data to the local processor via the local buses.

13. The CAU of claim 7, wherein the RTI includes a system register and wherein the CAU includes means responsive to the local processor for retrieving the data stored in the system register and providing the retrieved data to the local processor via the local buses.

* * * * *